(12) United States Patent
Smalligan

(10) Patent No.: US 10,610,014 B2
(45) Date of Patent: Apr. 7, 2020

(54) CLAMP ASSEMBLY

(71) Applicant: Lewis Joseph Smalligan, Grand Rapids, MI (US)

(72) Inventor: Lewis Joseph Smalligan, Grand Rapids, MI (US)

(*) Notice: Subject to any disclaimer, the term of this patent is extended or adjusted under 35 U.S.C. 154(b) by 0 days.

(21) Appl. No.: 15/483,143

(22) Filed: Apr. 10, 2017

(65) Prior Publication Data

US 2018/0242732 A1 Aug. 30, 2018

Related U.S. Application Data

(60) Provisional application No. 62/429,340, filed on Dec. 2, 2016.

(51) Int. Cl.
| *A47B 61/04* | (2006.01) |
| *A63B 55/00* | (2015.01) |
| *F16B 2/10* | (2006.01) |
| *F16B 45/02* | (2006.01) |
| *F16B 2/00* | (2006.01) |

(52) U.S. Cl.
CPC .......... *A47B 61/04* (2013.01); *A63B 55/408* (2015.10); *F16B 2/10* (2013.01); *F16B 2/005* (2013.01); *F16B 45/02* (2013.01)

(58) Field of Classification Search
CPC ... Y10T 24/3449; A47B 61/04; A63B 55/408; F16B 2/10; F16B 2/005; F16B 45/02; A47F 5/0884; A47F 7/06; A47F 7/19
USPC ............... 223/91, 93, 96; 248/229.1, 227.1, 248/229.14, 339, 340, 316.7, 315, 215, 248/229.15, 229.26; 24/343, 346, 457
See application file for complete search history.

(56) References Cited

U.S. PATENT DOCUMENTS

| 1,750,905 | A | * | 3/1930 | Schilpp | A47G 25/485 223/91 |
| 4,175,306 | A | * | 11/1979 | Bigelow | A47G 25/485 24/507 |
| 4,942,994 | A | | 7/1990 | Sterenberg | |
| 5,052,085 | A | * | 10/1991 | Gau | A47G 25/16 24/501 |
| 6,842,951 | B1 | * | 1/2005 | Barre | B25B 7/00 24/499 |
| 7,665,640 | B2 | * | 2/2010 | Misumi | A47G 25/483 223/95 |
| 7,775,410 | B2 | | 8/2010 | Zamzow | |
| 8,272,612 | B2 | | 9/2012 | Thorpe | |
| 8,616,384 | B1 | * | 12/2013 | Tucker | B65D 33/1675 211/85.15 |
| 8,714,370 | B2 | | 5/2014 | Jebara et al. | |
| 2014/0027597 | A1 | * | 1/2014 | Farris | F16B 7/105 248/339 |

FOREIGN PATENT DOCUMENTS

| CN | 201315890 | | 9/2009 | |
| DE | 9319019 | | 6/1994 | |
| GB | 704444 | A * | 2/1954 | ............... A47F 7/19 |

* cited by examiner

*Primary Examiner* — Jack W Lavinder
(74) *Attorney, Agent, or Firm* — Gardner Linn

(57) ABSTRACT

A clamp assembly having a clamp, a handle, and a clip. The handle is shaped so as to provide a novel and improved method and apparatus to hold shoes to a golf bag. The topline of the shoe is securely held by the clamp. The handle is attached to the clamp. And the clip is attached to the handle and can clip to a golf bag. The clip may be a carabiner clip.

11 Claims, 4 Drawing Sheets

CLAMP ASSEMBLY

CROSS REFERENCE TO RELATED APPLICATIONS

This non-provisional patent application claims reference to a provisional patent application filed on 2 Dec. 2016 titled CLAMP ASSEMBLY with application No. 62/429,340.

STATEMENT REGARDING FEDERALLY SPONSORED RESEARCH OR DEVELOPMENT

None.

BACKGROUND OF THE INVENTION

Golf shoes are normally stored inside a golf bag when not being worn. After playing golf, golf shoes attract dirt, sand, and grass and other debris. On early mornings dew may be on the grass, which increases the adhesive properties of grass attaching to golf shoes, and the same for wet grass, sand, and dirt from rain.

After golfing a player may place his or her shoes in a pocket in the golf bag. The dirt, sand, debris, and grass is then transferred into the pocket in the golf bag. So, the next time that the player uses the shoes, the shoes are still in contact with the old dirt, sand, debris, and grass, and much of the same debris remains and accumulates in the pocket of the golf bag.

What is needed is an apparatus and process to attach the golf shoes outside of the golf bag so the shoes can be cleaned and debris will not accumulate in the golf bag.

BRIEF SUMMARY OF THE INVENTION

One aspect of the present invention is a clamp assembly, comprising: a first clamp member having a first handle portion, a first jaw portion, and a first jaw pivot portion defining a first aperture said first jaw portion extending rightwardly of said first pivot portion; said first handle portion extending leftwardly from said first pivot portion; a second clamp member having a second handle portion, a second jaw portion, and a second pivot portion defining a second aperture said second jaw portion (extending rightwardly of said second pivot portion and said second handle portion extending leftwardly from said second pivot portion; a pin extending through the first aperture and second aperture such that the first clamp member and second clamp member are rotatable about an axis that extends through the pin; a compression spring between the first handle portion and the second handle portions away from one another; a handle extending downwardly from said pin and a clip removably secured to said handle.

Another aspect of the present invention is 6. A clamp assembly (10), consisting of: a first clamp member (26A) having a first handle portion (30A), a first jaw portion, and a first jaw pivot portion defining a first aperture; a second clamp member having a second handle portion, a second jaw portion, and a second pivot portion defining a second aperture; a pin extending through the first aperture and second aperture such that the first clamp member and second clamp member are rotatable about an axis that extends through the pin; a compression spring between the first handle portion and the second handle portions away from one another; a handle extending downwardly from said pin; and a clip removably secured to said handle.

DETAILED DESCRIPTION

Figure 1:
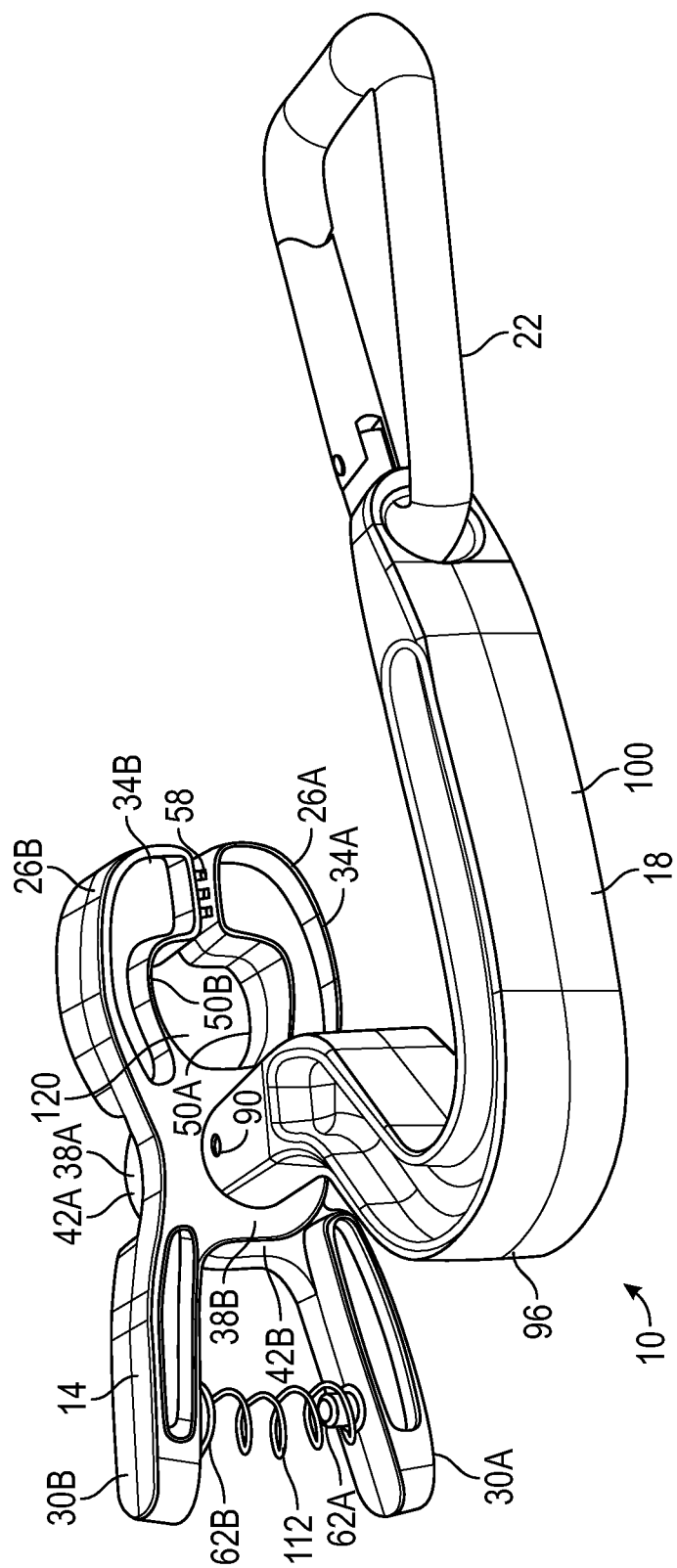
FIG. 1 is a pictorial view of one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

Figure 2:
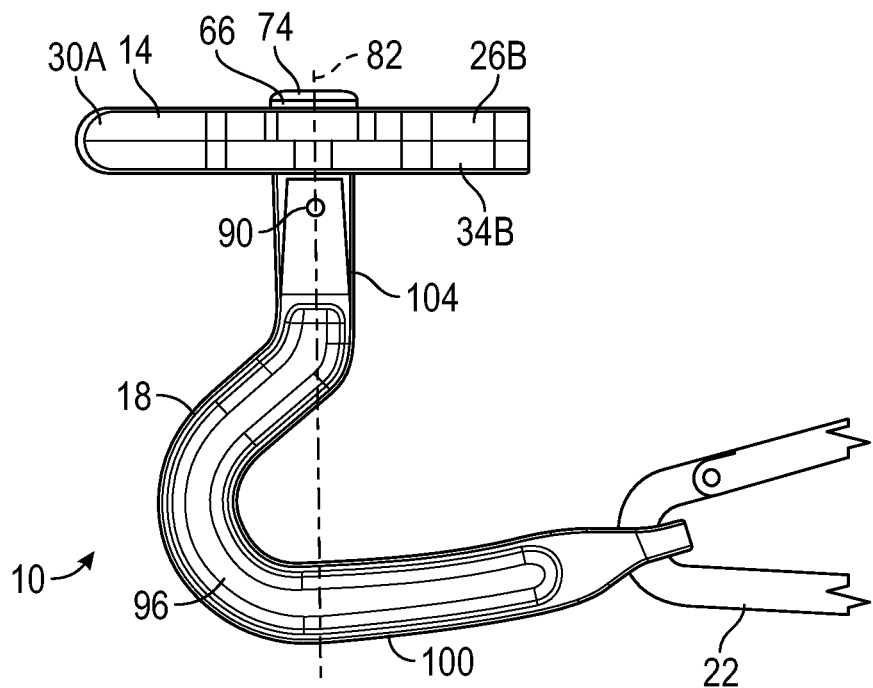
FIG. 2 is another pictorial view of an embodiment of the present invention.
Figure 3:
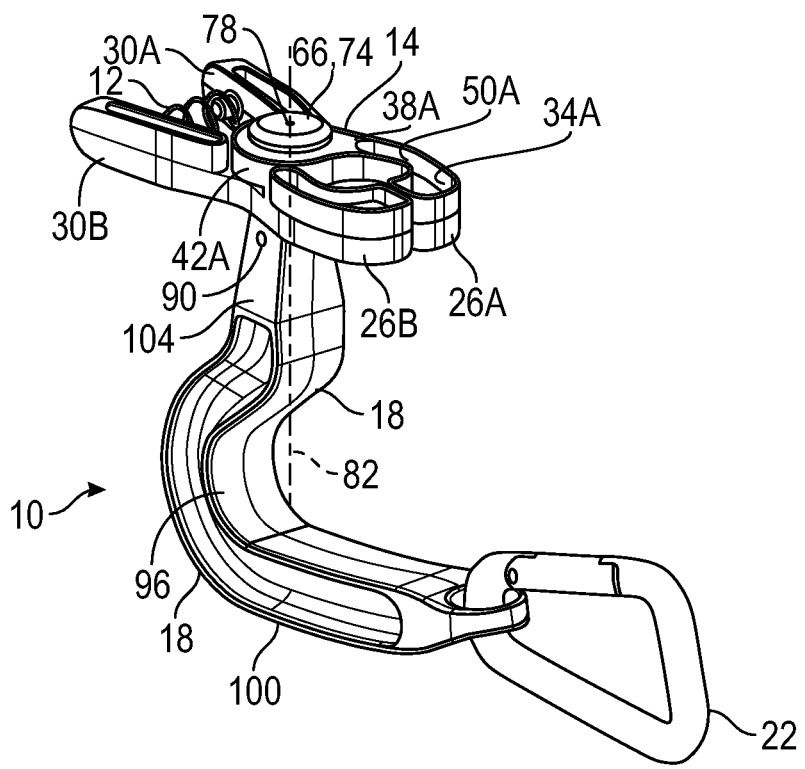
FIG. 3 is another pictorial view of an embodiment of the present invention.
Figure 4:
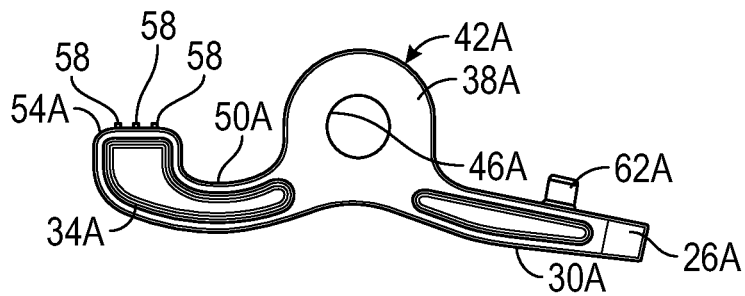
FIG. 4 is a view of one of the clamp members of the present invention.
Figure 5:
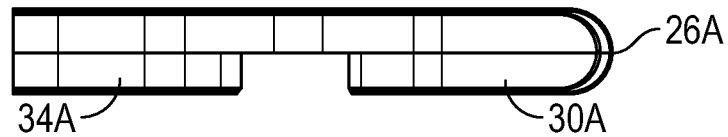
FIG. 5 is another view of one of the clamp members of the present invention.

Referring to FIGS. 1-3, wherein like reference numbers refer to like components, a clamp assembly 10 includes a clamp 14, a handle 18, and a clip 22. The clamp 14 includes first and second clamp members 26A, 26B. In the embodiment depicted, clamp members 26A and 26B may be identical to one another. Referring to FIGS. 4 and 5, wherein like reference numbers refer to like components from FIGS. 1-3, clamp member 26A is schematically depicted. As noted clamp members 26A and 26B may be identical to one another, and thus clamp member 26A may be representative of clamp member 26B. FIG. 1 also illustrates a jaw aperture 120 defined by a concavity 50A and concavity 50B of each respective first clamp member 26A and second clamp member 26B.

Figure 6:
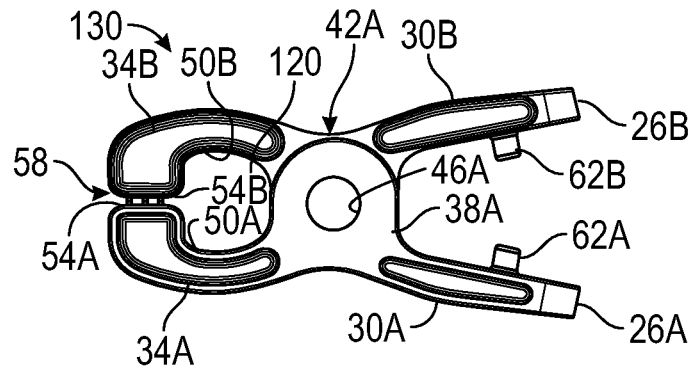
FIG. 6 is a view of the two clamp members.

FIGS. 1, 2, and 3 illustrate the clamp member 26*a* includes a first handle portion 30A and a second jaw portion 34A. Interconnecting the first handle portion 30A and the first jaw portion 34A is a first pivot portion 38A. The first pivot portion 38A may freely pivot about the pin 66. In the embodiment depicted, the first pivot portion 38A forms a portion of an annulus, with a surface 42A forming an arc that is more than half of the circumference of a circle. The first pivot portion 38A also defines a first aperture 46A (as seen in FIG. 6) having the same center point as the arc formed by surface 42A.

FIGS. 1 and 3 illustrate jaw portion 34A is characterized by a curvature, i.e., jaw portion 34A is bowed to at least partially define a concavity 50A. In the embodiment depicted, surface 42A cooperates with the jaw portion 34A to define concavity 50A. The jaw portion 34A also includes a flat surface 54A characterized by a plurality of teeth 58 protruding therefrom as best illustrated in FIGS. 1 and 6. As illustrated in FIG. 1, handle portion 30A includes a cylindrical protuberance 62A and handle portion 30B has a cylindrical protuberance 62B. A spring 112 may have two ends and each end of the spring 112 may fit over each cylindrical protuberance 62A, 62B which may then bias handle portion 30A away from handle portion 30B, which bias the first clamp member 26A toward second clamp member 26B.

Clamp member 26B is identified to clamp member 26A, and thus includes corresponding elements and features. More specifically, and with reference to FIGS. 6 and 7, wherein like reference numbers refer to like components from FIGS. 1-5, second clamp member 26B includes a second handle portion 30B and a second jaw portion 34B. As illustrated the second handle portion 30B may be on one side of the first aperture 46A, and the second jaw portion 34B may be on the other side of the first aperture 46A. For example, the second handle portion 30B may be rightwardly (in FIG. 6) of the first aperture 46A, and second the jaw portion 34B may be leftwardly of the first aperture 46A. Interconnecting the second handle portion 30B and the second jaw portion 34B is a second pivot portion 38B.

Figure 7:
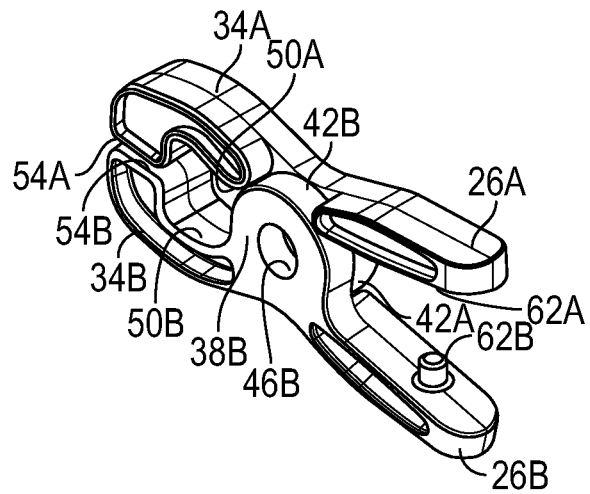
FIG. 7 is another pictorial view of an embodiment of the present invention.
Figure 10:
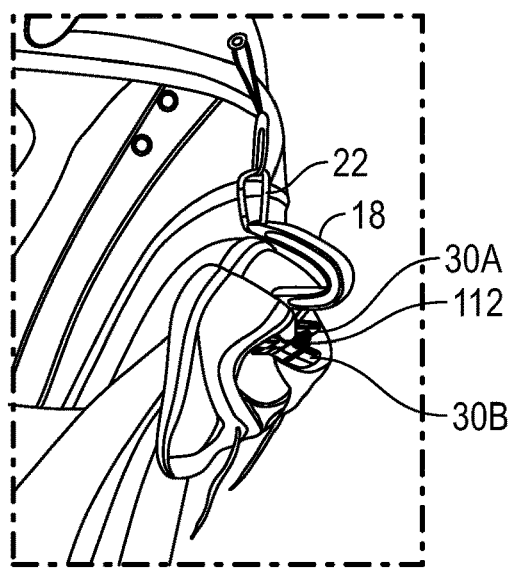
FIG. 10 is a pictorial view of the present invention on a golf bag.

As illustrated in FIG. 7, a second pivot portion 38B forms a portion of an annulus, with surface 42B forming an arc that is more than half of the circumference of a circle. The second pivot portion 38B also defines an aperture 46B having the same center point as the arc formed by surface 42B. FIG. 6 also illustrates that the first jaw portion 34A and second jaw portion 34B may be in the closed position 130. When in the closed position 130, the first and second jaw portions 34A and 34B define a jaw aperture 120. When the first handle portion 30A and second handle portion 30B are biased toward each other, then the first and second jaw portion 34A and 34B are biased away from each other. When in the open position, something can be placed between the first and second jaw portion 34A and 34B, then the spring 112 biases the first and second jaw portion 34A and 34B toward each other so as to hold and retain items placed in between the first jaw portion 34A and second jaw portion 34B, as seen in FIG. 10 where the present invention 10 is illustrated holding shoes by clamping the inside topline of a shoe. The portions of a shoe can be seen and disclosed at Source: http://www.daz3d.com/forums/discussion/.

As illustrated on FIG. 6, second jaw portion 34B is characterized by a curvature, i.e., second jaw portion 34B is bowed to at least partially define a concavity 50B. In the embodiment depicted, surface 42B cooperates with the second jaw portion 34B to define concavity 50B. When in the closed position 130, the concavity 50B 50A define a jaw aperture 120. The second jaw portion 34B also includes a flat surface 54B characterized by a plurality of teeth 58 protruding therefrom. Second handle portion 30B includes a cylindrical protuberance 62B as illustrated in FIG. 7.

As illustrated in FIGS. 3 and 6, first clamp member 26A and second clamp member 26B are positioned with respect to one another such that first pivot portions 38A and second pivot portion 38B are in contact with one another and first aperture of 46A is aligned with second aperture 46B.

Figure 8:
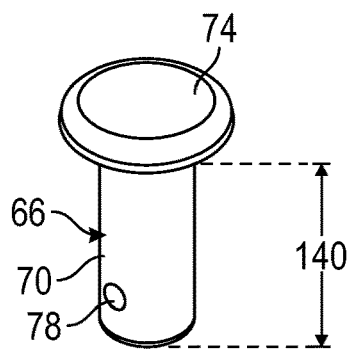
FIG. 8 is a pictorial view of an embodiment of a pin of the present invention.
Figure 9:
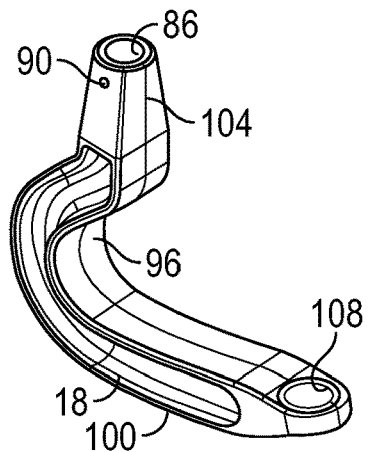
FIG. 9 is a pictorial view of an embodiment of an embodiment of the present.

The assembly 10 also includes a pin 66, as shown in FIGS. 8-10. With reference to FIGS. 8-10, the pin 66 includes a cylindrical body 70 and a head 74. The outer diameter of the body 70 is slightly less than the inner diameter of first aperture 46A and second aperture 46B, whereas the head 74 has a diameter greater than the inner diameter of the first aperture 46A and the second aperture 46B. The body 70 defines a pin hole 78 that extends through the body 70 perpendicular to the body's longitudinal axis. The pin 66 may be FIG. 8 illustrates a body 70 of the pin 66 extends through both the first apertures 46A and the second aperture 46B, the apertures are illustrated in FIGS. 6 and 7 thereby forming a joint such that the first clamp member 26A and second clamp member 26B are rotatable with respect to one another about an axis 82. The axis is illustrated in FIG. 2. Axis 82 is coextensive with the axis of symmetry of the body 70 and the center points of first and second apertures 46A, 46B (FIGS. 6 and 7).

FIGS. 1 and 9 illustrate the assembly 10 also includes a handle 18.

FIG. 9 illustrates at one end of the handle 18, the handle 18 defines a cylindrical hole 86 having a diameter slightly larger than the outer diameter of the body 70 of the pin 66. The depth or length of the hole 86 is slightly longer than the length 140 of the pin body 70.

A handle hole 90 extends through the handle 18. Handle hole 90 may be substantially perpendicular to axis 82. The body 70 of the pin 66 extends into hole 86 and handle hole 90 is aligned with the pin hole 78 formed in the pin 66 so that a cotter pin (not shown) extends through handle hole 90 and pin hole 78, thereby securing the handle 18 to the pin 66. Alternatively, the pin 66 may be secured into hole 86 by glue or any other form of adhesion, rather than the cotter pin.

Accordingly, the body 70 of the pin 66 extends through first aperture 46A and second aperture 46B and into hole 86. The handle 18 is thus rotatable relative to the clamp members 26A, 26B about axis 82. The handle 18 is made from generally rigid material, such as a rigid polymer or metal. The handle 18 includes a curved segment 96, which results in the handle segment 100 distal from the hole 86 being generally perpendicular to the handle segment 104 proximate to the hole 86. Segment 100 provides a segment 100 that a human user can grip with a hand and carry whatever is clamped within the jaws of clamp 14. In the embodiment depicted, handle segment 104 has a clip hole 108 (FIG. 9) through which the clip 22 may be secured. The clip 22 may be a carabiner clip 22 and may be able to open and close.

FIGS. 1 and 6 illustrate the clamp 14 shown in its closed, clamping position in which the teeth 58 of clamp member 26A contact the teeth 58 of clamp member 26B. To move the clamp 14 to its open position, a force is applied to one or both of the handle portions 30A, 30B, such that handle portion 30A is urged toward handle portion 30B. Relative motion between the clamp members 26A, 26B is substantially limited to rotation about axis 82 and as first handle portion 30A and second handle portion 30B move closer to each other, first jaw portions 34A and second jaw portion 34B move farther apart from one another, creating a space between the teeth 58 of first jaw portion 34A and the teeth 58 of second jaw portion 34B.

As illustrated in FIG. 10, when the clamp 14 is in its open position, an object may be placed between the teeth 58 of the jaw portions 34A, 34B. When the clamp 14 is moved back to its closed position, the teeth 58 will grasp whatever is between them and retain it. FIG. 10 illustrates the clip 22 connected to a portion of a golf bag, and a pair of shoes biasly secured between first jaw portion 34A and second jaw portion 34B.

As illustrated in FIGS. 1, 3, and 19, the assembly 10 includes a helical compression spring 112 that extends between first handle portion 30A and second handle portion 30B. The spring 112 urges first handle portion 30A and second handle portion 30B apart from one another, and thus biases the clamp 14 into its closed, clamping position.

Illustrated in FIGS. 1 and 3, each protuberance 62A, 62B extends into a respective end of the spring 112 thereby to retain the spring 112 in place between the first handle portion 30A and second handle portion 30B. It should be noted that no portion of the spring 112 is in the region near the pin 66, thereby allowing this design to be used for any number of uses.

Although the clamp assembly 10 may have many uses within the scope of this disclosure, one beneficial use is as a golf shoe carrier, as illustrated in FIG. 10. A pair of golf shoes may be secured in the clamp 14 and carried by handle 18 so that any dirt from the golf shoes remains away from a user's hands. The assembly 10 with golf shoes secured may then be attached to a golf bag by clip 22.

The clamp assembly 10 is more compact and easier to handle than the prior art. Opening and closing the clamp 14 may be performed with one hand (pressing the first and second handle portions 30A, 30B together), and the spring 112 automatically closes the clamp 14 when a user removes any force on the handle portions 30A and 30B. The attachment of the handle 18 at the pin 66 permits rotation of the handle 18 relative to the clamp 14, which enhances ease of carrying the shoes.

FIG. 10 illustrates an embodiment of the present invention 10 on a golf bag, as it would normally be used.

While the best modes for carrying out the invention have been described in detail, those familiar with the art to which this invention relates will recognize various alternative designs and embodiments for practicing the invention within the scope of the appended claims.

The invention claimed is:

1. A clamp assembly comprising:
a first clamp member having a first handle portion, a first jaw portion, and a first pivot portion defining a first aperture, said first jaw portion extending rightwardly of said first pivot portion, and said first handle portion extending leftwardly from said first pivot portion;
a second clamp member having a second handle portion, a second jaw portion, and a second pivot portion defining a second aperture, said second jaw portion extending rightwardly of said second pivot portion, and said second handle portion extending leftwardly from said second pivot portion;
a pin extending through the first and second apertures such that said first and second clamp members are rotatable about an axis that extends through said pin;
a spring mounted between said first and second handle portions, said spring biasing said first and second handle portions away from one another; and
a handle extending outwardly from said pin, said handle is a substantially rigid handle that is rotatable relative to said first and second clamp members about the axis, said handle comprising a proximal end attached to said pin and a free distal end portion comprising a gripping segment angled relative to said proximal end, wherein said free distal end portion cooperates with said proximal end to define an open receiving region, and said gripping segment is configured to be hooked onto another object received through said open receiving region;
wherein each of said first and second clamp members comprises only a singular pivot portion, each singular pivot portion interconnecting respective handle and jaw portions of said first and second clamp members.

2. The clamp assembly of claim 1, wherein said first and second jaw portions each have a plurality of teeth, and wherein said first and second clamp members are rotatable with respect to one another about the axis such that when said handle portions are moved towards one another, said jaw portions move away from each other.

3. The clamp assembly of claim 1, wherein said handle is curved such that said free distal end portion of said handle is positioned generally perpendicular to said proximal end of said handle.

4. The clamp assembly of claim 1, wherein said first clamp member is substantially identical to said second clamp member.

5. The clamp assembly of claim 1, wherein said pin is a removable pin and said handle is removably secured to said pin, and wherein said free distal end portion of said handle includes an opening and a clip removably attached to said free distal end portion of said handle at said opening.

6. The clamp assembly of claim 1, wherein said first pivot portion is at least partially extended into a gap formed directly between said second handle portion and second jaw portion, and wherein said second pivot portion is at least partially extended into a gap formed directly between said first handle portion and first jaw portion.

7. The clamp assembly of claim 1, wherein each of said first and second jaw portions is outwardly bowed to form a concavity defined by said first and second jaw portions.

8. A clamp assembly comprising:
a first clamp member having a first handle portion, a first jaw portion, and a first pivot portion defining a first aperture, said first jaw portion extending rightwardly of said first pivot portion, and said first handle portion extending leftwardly from said first pivot portion;
a second clamp member having a second handle portion, a second jaw portion, and a second pivot portion defining a second aperture, said second jaw portion extending rightwardly of said second pivot portion, and said second handle portion extending leftwardly from said second pivot portion;
a pin extending through the first and second apertures such that said first and second clamp members are rotatable about an axis that extends through said pin;
a spring mounted between said first and second handle portions, said spring biasing said first and second handle portions away from one another; and
a handle extending outwardly from said pin, said handle comprising a proximal end attached to said pin and a free distal end portion comprising a gripping segment angled relative to said proximal end, wherein said free distal end portion cooperates with said proximal end to define an open receiving region, and said gripping segment is configured to be hooked onto another object received through said open receiving region;
wherein said pin is a removable pin and said handle is removably secured to said pin, and wherein said free distal end portion of said handle includes an opening and a clip removably attached to said free distal end portion of said handle at said opening, wherein said clip is a carabiner clip.

9. A clamp assembly comprising:
a first clamp member having a first handle portion, a first jaw portion, and a first pivot portion defining a first aperture, said first jaw portion extending rightwardly of said first pivot portion, and said first handle portion extending leftwardly from said first pivot portion;
a second clamp member having a second handle portion, a second jaw portion, and a second pivot portion defining a second aperture, said second jaw portion extending rightwardly of said second pivot portion, and said second handle portion extending leftwardly from said second pivot portion;
a pin extending through the first and second apertures such that said first and second clamp members are rotatable about an axis that extends through said pin;
a spring mounted between said first and second handle portions, said spring biasing said first and second handle portions away from one another; and
a handle extending outwardly from said pin, said handle comprising a proximal end attached to said pin and a free distal end portion comprising a gripping segment angled relative to said proximal end, wherein said free distal end portion cooperates with said proximal end to define an open receiving region, and said gripping segment is configured to be hooked onto another object received through said open receiving region;
wherein said pin is a removable pin and said handle is removably secured to said pin, and wherein said free distal end portion of said handle includes an opening and a clip removably attached to said free distal end portion of said handle at said opening; and
wherein said pin comprises a cylindrical body and a head, wherein said body has an outer diameter that is less than an inner diameter of the first and second apertures, and wherein said head has a diameter that is greater than the inner diameter of the first and second apertures.

10. The clamp assembly of claim 9, wherein said body defines a pin hole extending through said body, said pin hole is oriented perpendicular to a longitudinal axis of said body.

11. The clamp assembly of claim 10, wherein said proximal end of said handle defines a cylindrical bore configured to receive said body, said proximal end defining a handle hole extending through said handle and intersecting said cylindrical bore, said handle hole configured to align with said pin hole for receiving a cotter pin to secure said handle to said pin.

* * * * *